(12) United States Patent
Ludwig

(10) Patent No.: US 6,754,228 B1
(45) Date of Patent: Jun. 22, 2004

(54) METHOD AND DEVICE FOR DATA FLOW CONTROL

(75) Inventor: Reiner Ludwig, Düren (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/281,428

(22) Filed: Mar. 30, 1999

(30) Foreign Application Priority Data

Mar. 31, 1998 (EP) .......................................... 98105859

(51) Int. Cl.[7] ................................................ H04J 3/16

(52) U.S. Cl. .................. 370/468; 370/231; 370/395.21; 370/395.41; 370/449

(58) Field of Search ................................ 370/229, 230, 370/231, 232, 235, 236.1, 237, 465, 463, 468, 282, 230.1, 252, 395.21, 395.41, 401, 449

(56) References Cited

U.S. PATENT DOCUMENTS

| | | | | |
|---|---|---|---|---|
| 5,130,986 A | * | 7/1992 | Doshi et al. ................. | 370/231 |
| 6,219,713 B1 | * | 4/2001 | Ruutu et al. ................. | 709/235 |
| 6,252,851 B1 | * | 6/2001 | Siu et al. ..................... | 370/236 |
| 6,320,846 B1 | * | 11/2001 | Jamp et al. .................. | 370/235 |
| 6,370,114 B1 | * | 4/2002 | Gullicksen et al. ......... | 370/229 |
| 6,438,101 B1 | * | 8/2002 | Kalampoukas et al. ..... | 370/229 |

FOREIGN PATENT DOCUMENTS

| | | | |
|---|---|---|---|
| EP | 0 454 364 A | 10/1991 | |
| EP | 0 454 364 A2 | * 10/1991 | ........... H04L/12/56 |
| EP | 0 693 840 A | 1/1996 | |
| EP | 0 693 840 A1 | * 1/1996 | ........... H04L/12/56 |

OTHER PUBLICATIONS

Henderson, R.H., Katz, R.H., "Satellite Transport Protocol (STP): An SSCOP–based Transport Protocol for Datagram Satellite Networks," 1997, WOSBIS 97, University of California at Berkley.

Balakrishnan, H., Padmanabhan, N.V., Seshan, S., Stemm, M., Katz, H.R.: "TCP Behavior of a Busy Internet Server: Analysis and Improvements," 1998 IEEE, University of California at Berkeley.

Allman, M., Kruse, H., Ostermann, S.: "An Application–Level Solution to TCP's Satellite Inefficiencies," 1997, WOSBIS Nov. 97, Ohio University.

Internet draft: TCP Extensions for High Performance, Feb. 1997, http://www.globecom.net/(eng)/ietf/draf... ft–ietf–tc-plw–high–performance—00.sht, Jan. 23, 1998.

*Proceedings of the 1996 IEEE Fifteenth Annual International Phoenix Conference on Computers and Communications*, Scottsdale, Arizona, USA, Mar. 27–29, 1996, no. Conf. 15, Mar. 27, 1996, pp. 239–245, XP00594795, Institute of Electrical and Electronics Engineers, I. Miloucheva et al., "Protocol Mechanisms for Reliable Transmission and Flow Control on Multimedia Highways".

* cited by examiner

*Primary Examiner*—Dang Ton
*Assistant Examiner*—Tri H. Phan
(74) *Attorney, Agent, or Firm*—Nixon & Vanderhye P.C.

(57) ABSTRACT

A method and device for controlling the flow of a data amount from a sender to a receiver in a packet exchange connection. The packet exchange connection includes a plurality of links connected by routers. The sender determines from the data amount a data sequence to be sent. One or more bandwidth values respectively associated with one or more of the links is automatically determined. One or more bandwidth values is employed in the process of controlling the flow of the sequence from the sender to the receiver. This flow control directly takes properties of the connection into account.

30 Claims, 7 Drawing Sheets

METHOD AND DEVICE FOR DATA FLOW CONTROL

FIELD OF INVENTION

BACKGROUND

The internet is a communication network that comprises a number of different service layers. The lowest layer is the hardware layer, onto which software layers of different functions are added. As an example, the world wide web (WWW) is a layer above the basic internet layer provided by the internet protocol (IP).

The internet is a packet exchange network, where the basic structure of information is determined by the internet protocol. A protocol is a set of rules to which two partners in an intended communication must adhere to thereby enable the communication. The internet protocol regulates addressing, i.e., it ensures that routers between two communication points are capable of sending data packets to their destination. An IP packet consists of a header, which contains information relating to data being sent, and a body containing the data itself.

In order to facilitate the reliable transmission of data between two ends of a communication, a further protocol is provided, the transmission control protocol (TCP). TCP takes the information to be sent and divides it into given segments. Each segment receives a number so that the receipt of a given segment can be acknowledged by the receiver, and the receiver is able to put the information together in the correct order. TCP has its own header carrying its own information that is used by this protocol. The TCP packets are sent over the internet by being placed into IP packets, i.e. the TCP packet is encapsulated in the (lower layer) IP packet. This is why the transport of packets across the internet is often referred to as TCP/IP.

FIG. 2 shows a body of data 100 divided into 8 data segments of equal size, respectively numbered 1 to 8. As an example, the body 100 could have a size of 8192 bytes so that each data segment would comprise 1024 bytes. The information that actually needs to be sent will usually be somewhere between 7168 bytes and 8192 bytes. The final data segment 8 will simply be filled by "padding" to thereby achieve equal sized data segments. The precise size of a single data segment is not fixed to the above example of 1024 bytes, but will be appropriately selected by a sending system in accordance with given constraints, e.g., the maximum transmission unit (MTU) allowed by a specific link.

The term "window" describes an amount of bytes, or more generally, a data amount expressed in units of data. According to TCP, the receiver sends an "advertised" or offered window to the sender in response to a packet from the sender that initiates communication. A TCP sender is not allowed to have more unacknowledged packets outstanding than the amount defined by the advertised window. The receiver sends an advertised window in each acknowledgment message or packet.

The advertised window usually corresponds to the input buffer capacity on the receiver side. The function of the advertised window is to prevent a fast sender from letting the input buffer of a slow receiver overflow.

The mechanism of sliding window control will be explained by referring to FIGS. 3 and 4, which illustrate an example of sending the data amount 100 shown in FIG. 2, and by referring to FIGS. 5 and 6, which illustrate the principal of sliding window control.

FIG. 3 illustrates an example of the transmission of the 8 segments of data shown in FIG. 2, where the sender is shown on the left hand side and the receiver is shown on the right hand side. Each arrow indicates the sending of a packet, where the double lined arrows correspond to packets containing data segments, as will be explained in more detail below. The sending of individual packets is illustrated by reference labels S1 to S20, where each act of sending from either of the two sides is also referred to as a segment. This indicates that generally one packet containing the data of FIG. 2 will contain one data segment. The direction of time is from top to bottom.

The sequence shown in FIG. 3 is a simplification for explaining the flow control, and therefore not all packets carry a reference label, as these relate to other aspects of communication. Also some of the segments carrying reference labels also carry more data, but as this supplementary data again relates to other aspects of the communication than flow control, it is not illustrated here. The notation X:Y(Z) means that bytes number X to Y are sent, which make up a total of Z. Ack X means that the receipt of bytes up to number X is acknowledged, and Win X means that a window of X bytes is advertised.

The segments S1 to S3 between sender and receiver relate to the establishment of communication, and will not be explained further, except that the receiver announces a window of 4096 bytes in segment S2. In segments S4 to S7 the sender sends the first three data segments 1 to 3, i.e. the bytes 1 to 1025, 1025 to 2049 and 2049 to 3073. The receiver acknowledges the receipt of the bytes up to 2049 in S7, where S7 again advertises a window of 4096. Why the receiver does not acknowledge up to 3073 is of no importance for explaining flow control. It is e.g. possible that this data segment is delayed in processing on the receiving side. In segment S8 the receiver acknowledges up to 3073 and advertises a window of 3073. Again, the reason for this is of no importance for the explanation of flow control. It is e.g. possible that there is still a delay in the receiver's input buffer, and therefore the reduced window serves to prevent overflow. In segment S9 the sender sends one more data segment, namely bytes 3073 to 4097. These are acknowledged in segment S10, in which again a window of 4096 is advertised. The sender then sends three data segments in segments S11 to S13, namely bytes 4097 to 5121, 5121 to 6145 and 6145 to 7169. In segment S14, the receiver only acknowledges up to byte 6145, but continues to advertise a window of 4096. In segment S15, the sender sends the last data segment consisting of bytes 7169 to 8193, where the receiver acknowledges the receipt of all bytes up to 8193 in segment S16. The remaining exchanges S17 to S20 do not relate to flow control.

As can be seen, not every data segment needs to be acknowledged individually, the receiver can also acknowledge the receipt of a number of data segments up to a given segment with one acknowledge message.

FIG. 5 shows the principle of sliding window based flow control. The numbers 1 to 11 refer to data segments, e.g. these can be the data segments shown in FIG. 2, or simply be a given number of bytes. With respect to the explanation of window based flow control, it is only important to note that the window 200 covers a certain amount of data, where the control window between left edge 201 and right edge 202 covers data segments 4 to 9. In the example of FIG. 5 the control window is the advertised window. (Another type of control window will be described later.) The position of the left edge of the window 200 is determined by the number of data segments already sent (by the sender) and acknowledged (by the receiver). In FIG. 5, this means that data segments 1 to 3 have been sent and acknowledged.

Although the data flow above is explained in connection with the example of a sequence of segments, it should be noted that TCP is a stream oriented protocol, such that the sequence base is in terms of bytes. Therefore the acknowledgment messages from the receiver do not indicate received segments, much rather they indicate up to which byte of the sequence data has been received.

The sender calculates the usable window, i.e. the amount of data that can be sent, as the difference between the total window size and the amount of data that has been sent but not yet acknowledged. In FIG. 5, the usable window from divide 203 to right edge 202 covers data segments 7 to 9. Therefore, these data can be sent. The data segments beyond the right edge 202, i.e. 10, 11, etc., cannot be sent until the window moves to cover them. The movement of the window shall be explained in the following.

FIG. 6 shows the principle of adjusting the window in time. Over time the window moves to the right, as the receiver acknowledges data. The relative motion of the two edges 201 and 202 increases or decreases the size of the window. Three different terms are conventionally used to describe this motion: the window closes as the left edge 201 moves to the right, the window opens as the right edge 202 moves to the right, and the window shrinks as the right edge 202 moves to the left. The movement of the edges 201, 202 is governed by the position of the left edge 201 in accordance with how much data has been sent and acknowledged, and by the advertised window size, which starting from a given left edge 201 determines the right edge 202. It may be noted that the left edge does not move left, and if an acknowledgment (ACK) was received that implied moving the left edge to the left, it would be a duplicate ACK and consequently discarded.

If the left edge 201 reaches the right edge 202, then the resulting window 200 is called a zero window. This stops the sender from transmitting any data.

The above described principle of flow control is illustrated with reference to FIG. 4, which explains the sliding window flow control for the example given in FIG. 3. The top of the figure shows the data segments of FIG. 2, and the bars and arrows below represent and illustrate the movement and change of the flow control window in time, in response to the sending of data by the sender and the acknowledging by the receiver. As can be seen, the sender does not have to transmit a full window's worth of data. Each acknowledgment from the receiver slides the window to the right. The size of the window can decrease, as shown by the change from segment S7 to S8, but the right edge of the window must not move leftward. Also, the receiver does not have to wait for the window to fill before sending an ACK.

In the above description, the window that determined the flow control was the advertised or offered window from the window. In other words, the advertised window is the instrument with which the receiver influences the flow control, which itself is naturally performed by the sender. As already mentioned, the receiver uses the advertised window to prevent an overflow of its input buffer. Usually therefore the size of the advertised window is controlled by the receiving process.

Besides the problem of a fast sender causing a slow receiver to overflow, there also exists the problem that congestion can occur on the network. This is a problem which occurs not at the receiving end of a connection, but between the sending and receiving end. As is well known, a typical connection on the internet is established through other members, which act as routers, and these routers can be connected by widely varying types of hardware, where such connections between routers are commonly referred to as links. In other words, a packet from a sender to a receiver will guided by routers through links to other routers until it arrives at the receiving end. Congestion is the effect that occurs when a given link is not large enough (does not have a sufficient transmission capacity) to handle the amount of data to be sent through said link. This can e.g. happen when data arrives on a link having a large capacity ("big pipe", e.g. a fast LAN) and exits on a link having a lower capacity ("small pipe", e.g. a slow WAN), or when multiple input streams arrive at a router whose output capacity is less than the sum of the inputs.

FIG. 7 shows an example of congestion. In this figure, packets containing data segments like the ones shown in FIG. 2 and accordingly carrying numbers 1 to 8, arrive at a router R1 over a link 300 having a large transmission capacity. Link 301, into which R1 routs the packets, is smaller than link 300. It should be noted that the packets are represented with hatched areas, where the area corresponds to the size of the packet. This means that the area of packet 3 or 4 shown in link 301, is equal to the area of packets 5 or 6 in link 300, or of 1 and 2 in link 302. As can be seen, R1 acts as a "bottleneck", because it cannot send the packets into link 301 as fast as they arrive on link 300. As can also be seen from the figure, router R2 can only put the packets into link 302 as fast as they arrive from the low capacity link 301. Consequently, the link of lowest capacity determines the spacing of packets.

In the example of FIG. 7, it is assumed that the receiver advertised a window having a size that corresponds to 8 segments, so that the sender sent all eight as fast as link 300 could take them. It is also assumed that router R1 has a sufficiently large buffer to store the incoming packets until they can be sent out. However, this latter assumption is often not fulfilled. Congestion can lead to the discarding of packets, which in turn means that packets need to be retransmitted, i.e., transmission is handicapped.

In order to take congestion into account, the control of data flow in TCP is not only performed in accordance with the above described advertised window, but also in accordance with the congestion window. The congestion window is used by a routine called slow start in the following way. When a new connection is established, the congestion window is initialized to one segment of data. Each time that an acknowledgment is received by the sender, the congestion is increased by one segment. The sliding window control explained above, (see FIGS. 5 and 6), is performed with either the advertised window or the congestion window, whichever is smaller. In other words, if the congestion window is smaller than the advertised window, then the control window 200 shown in FIG. 5 would be the congestion window and not the advertised window. The process of determining the position of the left edge of the control window is performed exactly as described above in connection with FIGS. 4, 5 and 6, but the position of the right edge is determined with the minimum of the advertised and the congestion window.

The advertised window is determined by the receiver, whereas the congestion window is determined by the sender. Therefore the congestion window is flow control imposed by the sender, while the advertised window is flow control imposed by the receiver. The former is based on the sender's assessment of perceived network congestion, the latter is related to the amount of available buffer space at the receiver.

When sliding windows flow control is performed by using slow start and the congestion window as described above, the sender starts by transmitting one segment or packet and waiting for the corresponding acknowledgment ACK. When that ACK is received, the congestion window is incremented from one to two, and two segments can be sent. In general, each received ACK increases the window by one. Therefore, when each of these two segments is acknowledged, the congestion window is increased to four etc. This leads to an exponential increase. It should be noted that the exponential increase is not in terms of time proper, but in terms of the round trip time (RTT). The RTT is the time that passes between the sending of a given byte and the receipt of the corresponding acknowledgment message. Due to this exponential increase, the size of the congestion window may rapidly reach a value that, although it is still smaller than the advertised window, leads to congestion, as explained in connection with FIG. 7.

Congestion will typically lead to packet loss, which can be noticed by time-outs occurring in the communication (when a packet is sent, a time-out clock starts to run, and if no acknowledgment is received in the preset period of time, a time-out is issued) or by duplicate ACKs being received.

In order to deal with this problem, a congestion avoidance method is proposed, which is e.g. described in chapter 21.6 of the above mentioned book by W. R. Stevens. In accordance with this method, which is usually implemented together with the above described slow start method, a congestion window value and a slow start threshold value are kept. Initially the congestion window is set to one segment and the threshold value to the maximum window size allowed (typically 65535 bytes). The control window is chosen as the minimum of the advertised window and the congestion window. When congestion occurs and this is noticed by a time-out taking place, one half the current control window is stored as the threshold value and the congestion window is set to one segment. Time-out is a function according to which a timer measures the time that passes since the sending of a packet, and a time-out warning is issued if no acknowledgment is received within a predetermined period of time. Then, the slow start method is employed (with its exponential increase in window size) until the control window size reaches the threshold value, after which the congestion avoidance method sets in, which dictates that the congestion window be incremented with the reciprocal value of the congestion window, which leads to a linear increase in the size of the congestion window.

Another indication of congestion is the receipt of a duplicate acknowledgment, after which the congestion window is set to one half of the current control window and the congestion avoidance method is used. Time-outs and duplicate acknowledgments, and the reactions thereto are well known in connection with TCP, so that no further explanation is necessary.

As a consequence of the above, the basic flow control performed by TCP leads to constant probing for more bandwidth by the sender. Bandwidth is defined as the rate of data transmission, i.e. is given in unit of data per unit of time, e.g. bits/s. This constant probing for bandwidth, even if it is done in accordance with the above described method of congestion avoidance that causes the congestion window to only increase linearly after a certain point, has the effect that congestion will nonetheless occur, as long as the receiver advertises a large enough window.

This problem is not restricted to TCP, but will occur in any system that employs sliding window flow control.

SUMMARY OF THE INVENTION

It is the object of the invention to overcome the above mentioned problems and to provide an improved method and device for flow control. Flow control in a connection over which an amount of data is to be sent directly employs information on the connection, namely one or more bandwidth values associated with links forming the connection. In this way, flow control can directly be adapted to the situation on the network.

According to a preferred example embodiment, in a system in which sliding window flow control is being used, a window size is calculated in dependence on the bandwidths, and the window size is employed in the process of determining a control window in the sliding window flow control.

Employing the window size in the process of determining a control window means that e.g. the window is directly used as the size of the control window, or is compared with other available window size values (e.g. a congestion window size and an advertised window size known from TCP) and the control window size is determined from this comparison, e.g. the smallest of the available window sizes is selected.

The basic effect of defining a window in the above described way, is that this new window, which is also referred to as the bottleneck window, takes into account that one of the links in the connection is capable of being the bottleneck for packet transmission, and taking the bottleneck window into account during sliding window flow control can minimize congestion at one of the links whose bandwidth is taken into account for the determination of the bottleneck window.

According to another preferred example embodiment, the bottleneck window is determined by obtaining a respective bandwidth value for each of the links under consideration, determining the minimum of the plurality of bandwidth values, determining a time value that characterizes the amount of time that passes between the sending of a given byte and the receipt of an acknowledgment that the given byte has been received at the other end of the connection, and calculating the product of the time value and the minimum bandwidth value as the bottleneck window.

Preferably, the time value is the round trip time value for the given packet exchange connection in the direction that the packets are to be sent.

According to another preferred example embodiment, the bandwidth value associated with a link is the physical bandwidth of the link, i.e. the total amount of data that can be sent through the link at a given point in time. According to another preferred embodiment, the bandwidth value associated with a link is the actual bandwidth value available to the packet exchange connection at the link. The latter embodiment takes into account that more than one connection can be running through a link.

In accordance with a further preferred embodiment, only one bandwidth value is taken into account, namely the available bandwidth of the access link. The access link is the link between the device at the end of the packet exchange connection and the next router along the packet exchange connection. This embodiment leads to the bottleneck link being defined on the basis of the bandwidth of the access link, so that the possibility of congestion at said access link can be reduced. The access link being measured can be either that of the device acting as a sender in the connection, or that of the device acting as a receiver.

Preferably, this embodiment is such that the bandwidth of the access link is provided by the component that controls the link layer through said access link. As an example, if the device at the end of the packet exchange connection is a personal computer and the access link is a modem link to an internet provider, then the link layer is established by an appropriate link protocol, such as SLIP (Serial Line Internet Protocol), PPP (Point-to-Point Protocol) or RLP (Radio Link Protocol, used in connection with GSM) and the component controlling the link layer is the driver governing the exchange between the personal computer and the modem. As another example, the access link can be a digital telephone link such as an ISDN line or a connection in a digital cellular phone network, where the driver then does not control a modem, but controls an appropriate adapter device, such as an ISDN adapter card.

This last embodiment has the advantage that it is easily implemented, as it can be implemented into any member of a packet exchange network without having to change the network or the protocols governing the network, and is especially effective if the access link contains a radio transmission part, such as an access link over a cellular telephone, because in such a case the access link will typically be the bottleneck link, i.e. the link among all the links forming the packet exchange connection that provides the sender with the lowest bandwidth. In other words, in this case the occurrence of congestion in the total packet exchange connection can be completely avoided if congestion is avoided at the access link, which the present invention can ensure in the above embodiment.

According to another preferred embodiment, two bandwidth values are determined, namely those of the access link of the sender and receiver, respectively. In this way, the occurrence of congestion at one of these links can be reduced.

The present invention offers a simple, effective and flexible solution to the above mentioned problem of congestion avoidance, and can be applied in any communication system.

It can be especially applied to systems using sliding window flow control. As already mentioned, the flow control can be conducted by using the bottleneck window alone, or by combining the use of the bottleneck window with known windows for the given system. For example, when applying the invention to TCP, this protocol could be changed such that flow control is conducted only with the bottleneck window, or the use of the bottleneck window can be added to the use of the known windows, i.e. the congestion window and the advertised window, e.g. by determining the control window as the minimum of the advertised window, the congestion window and the bottleneck window.

In the latter case, i.e. when applying the invention by adding the bottleneck window to an existing window or windows and then selecting the control window from these windows, the invention offers the supplementary advantage that the conventional transmission protocol (e.g. TCP) would not have to be changed and the invention would still be effective even if it is only implemented in one end of a connection. In other words, in this latter case, compatibility to existing implementations of the standard transmission protocol could be retained, while still having the benefit of enhanced performance.

By defining a new window to be used in the sliding window flow control, namely the bottleneck window, a preferred embodiment of the present invention departs from the concept laid out in the prior art, in which the existing windows (advertised window, congestion window) were used together with new algorithms, e.g. the above described congestion avoidance algorithm. In contrast thereto, by defining the bottleneck window, which takes into account local information on the bandwidth of individual links among the links forming the packet exchange connection, the present invention achieves a simple and highly flexible method, where the use of this bottleneck window, be it alone or in conjunction with known windows, achieves a more effective congestion avoidance than the known solutions.

BRIEF DESCRIPTION OF THE DRAWINGS

These and other advantages will become more apparent from the following description of preferred embodiments of the invention, which will be described in conjunction with the enclosed drawings, in which.

DETAILED DESCRIPTION

Most of the examples given below will be explained in connection with communication in accordance with TCP. As the present invention can be combined with the known elements of flow control in accordance with TCP, the previous description of flow control in TCP is herewith incorporated by reference into the disclosure of the invention. It should however be remarked that the present invention is not restricted to being applied to TCP, but may be applied to any communication system using sliding window flow control.

Figure 7:
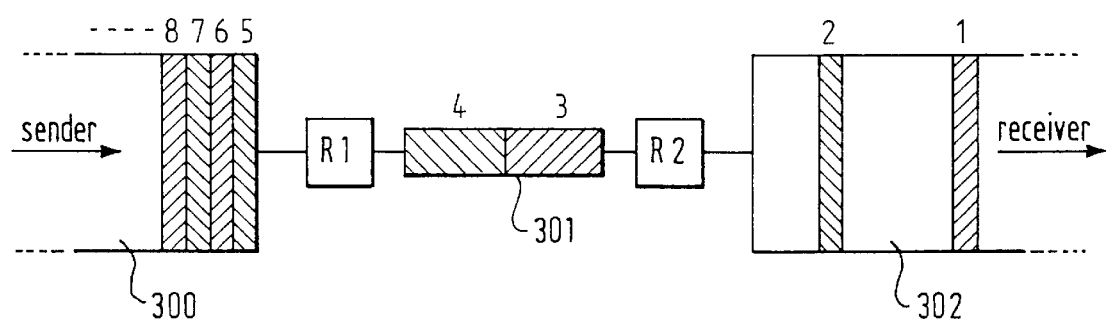
FIG. 7 is a schematic representation for explaining congestion at a link along a communication path.

A connection between two communication partners in a packet exchange network such as the internet typically consists of a number of individual links, where said links are connected by routers. For example, a personal computer may be connected to a server over a fast LAN, the server to another member of the internet (also referred to as an internet protocol peer or IP peer) over a slow WAN, and this other member of the internet to the receiver, again over a fast LAN. The LAN and WAN constitute links, whereas the servers are the routers, i.e. the devices that route the packets towards their destination in accordance with the routing information contained in the packets. This situation corresponds to what is schematically shown in FIG. 7, where the first LAN would be link 300, the first server router R1, the WAN link 301, the other internet member router R2, and the second LAN link 302. Another example would be a personal computer connected to an internet server over a slow modem link, the server being connected to another IP peer over a dedicated satellite link, and the this IP peer being connected to the receiver again over a slow modem link.

Figure 1:
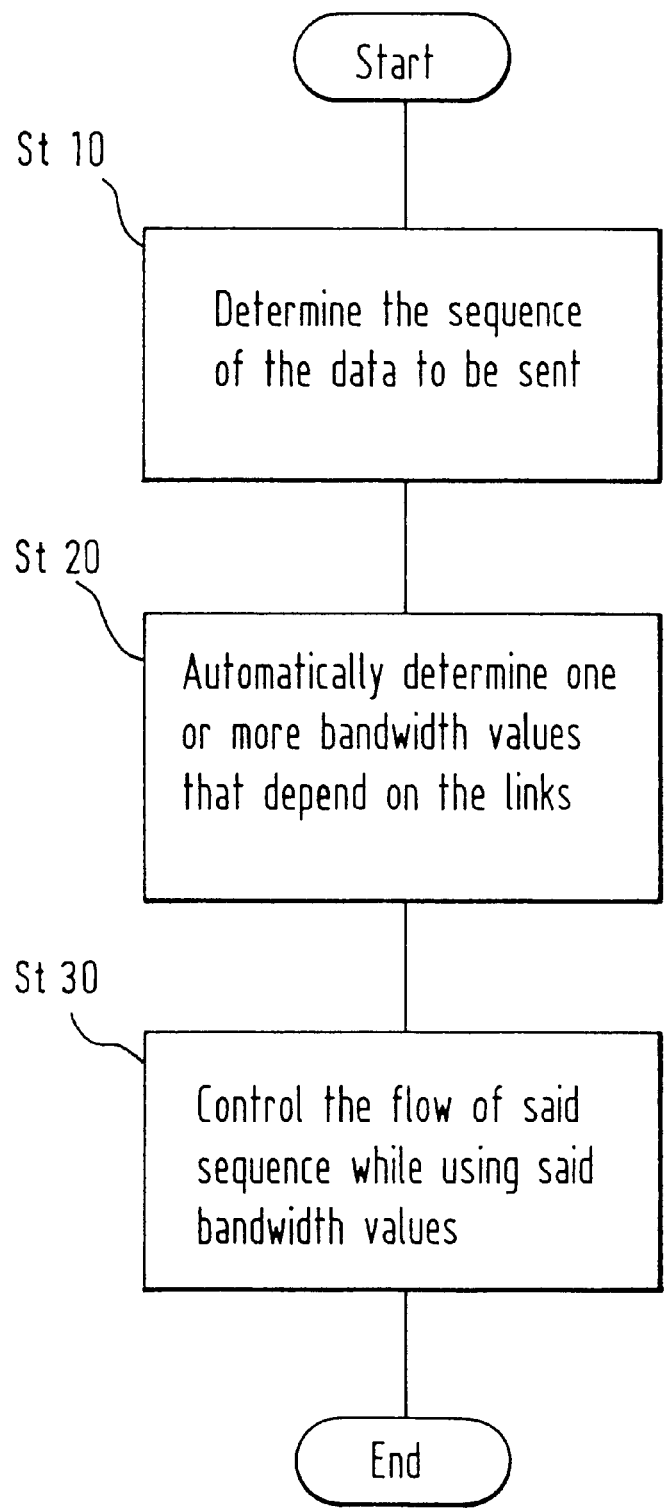
FIG. 1 shows a flowchart illustrating a basic embodiment of the present invention.

FIG. 1 illustrates a basic embodiment of the method of flow control according to the present invention. The flow of data in a packet exchange connection between two communication partners is controlled, where said connection consists of a plurality of links connected by routers. An example is a TCP/IP connection over the internet. In the connection, the partner that has data to send is the sender, and the other partner is the receiver. In a first step St10, the sequence of the data to be sent (e.g. an e-mail) is determined for the sender. This means that a sequence of data units (e.g. bytes) of the data to be sent is determined.

In a further step St20, bandwidth values associated with at least one of the links in the connection over which the data are to be sent are automatically determined. This can be done in very many different ways. For example, one or both of the partners in the connection can monitor bandwidth values of one or more links in the connection in the direction in which data is to be sent, i.e. in the direction from sender to receiver. One possibility is to have the routers along the connection add these bandwidth values to packets being sent to the receiver, or more preferably to acknowledgment packets being returned to the sender. Another possibility is to adapt the link layer driver in one or both of the partners to monitor the bandwidth value of that partner's access link. The access link is the link that connects the partner with the next router in the connection to the other partner. The bandwidth value associated with a link can be any value that gives an indication of how much data per unit of time said link can carry. For example, this can be the physical bandwidth value of the link, i.e. the total bandwidth of the link, or more preferably this can be the bandwidth momentarily available to the connection at that link.

Finally, the flow of said sequence of data is controlled by employing said bandwidth values. This means that the flow of data from the sender is controlled by automatically taking into account the one or more bandwidth values, such that congestion can be minimized. This can be done, e.g. in a system using sliding window based flow control by determining a window value from the one or more bandwidth values and then using said window value as the control window, or selecting the control window from a group that inter alia contains said window value. In this way, the present invention achieves a system in which the flow of data is controlled in automatic dependence on parameters directly characterizing the connection.

It should be noted that the hardware for controlling the flow can be provided in any suitable or desired way, e.g. in a device that simultaneously controls both partners in the connection, but more preferably the control according to the present invention is incorporated directly in one or both of the partners in the connection. It is an important advantage of the present invention that, according to a preferred embodiment, it can be implemented in only one partner of a connection and nonetheless achieve an improved flow control for the total connection.

Figure 8:
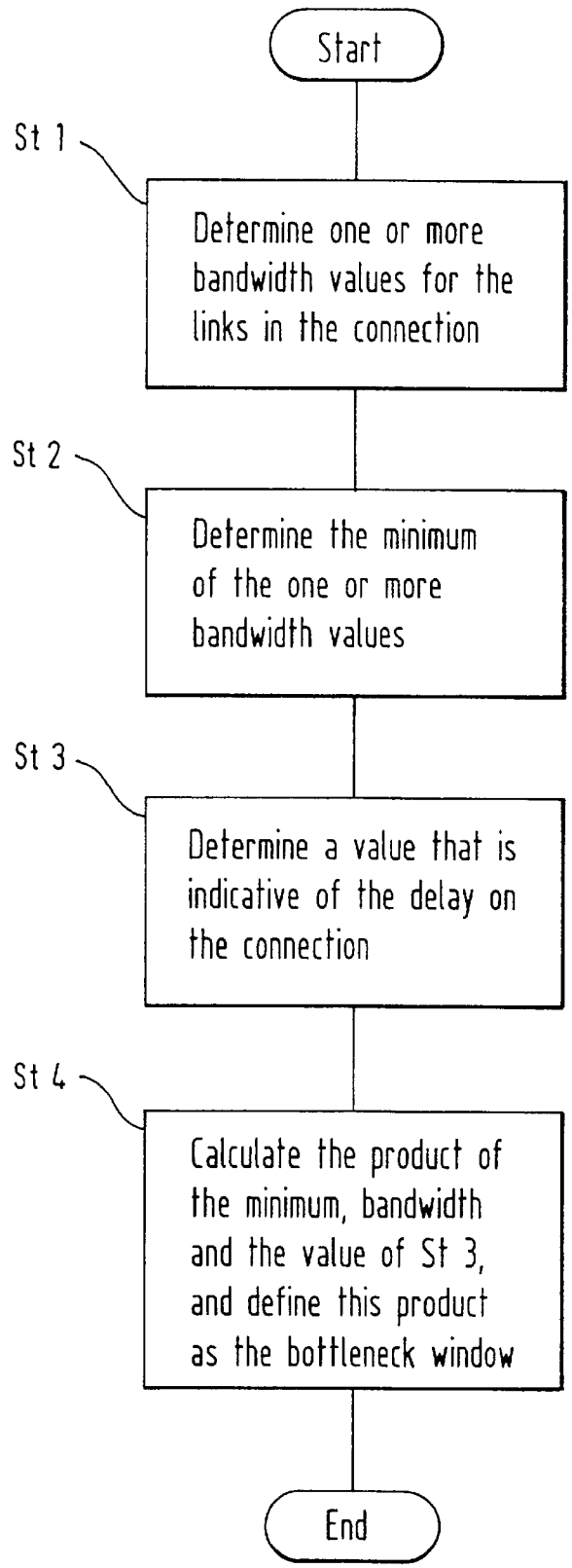
FIG. 8 shows a flowchart illustrating a preferred embodiment for determining the bottleneck window.

FIG. 8 shows a flow chart of a preferred embodiment of the method of the present invention. In a first step St1 one or more bandwidth values associated with the links along the connection are determined. Bandwidth is defined as an amount of data per unit of time, e.g. bits/s. It should be noted that the links in the connection are those that establish the path between sender and receiver in the direction in which the packets are to be sent or are being sent. This is due to the fact that the path or connection along which packets are sent from the sender to the receiver is not necessarily identical with the path along which packets are sent from the receiver to the sender.

The mechanism for determining which bandwidth is to be associated with a given link is not essential to the invention and can be chosen in any suitable way. According to a preferred embodiment of the invention, the value to be associated with a given link is the bandwidth of the physical connection corresponding to said link. As an example, if the link is formed by a modem with a transmission speed of 28800 bit/s, then the associated bandwidth is 28800 bit/s. It is to be noted that the physical bandwidth can either be the absolutely maximum bandwidth that a specific link can offer, in which case the value is constant for a given link, or the maximum bandwidth under the prevailing conditions. This differentiation is important when a link is given by radio communication, in which case the absolute maximum is the value under ideal radio conditions, and the prevailing maximum is the value allowed by the momentary conditions.

It should be noted that this physical link bandwidth thus defined is independent of how much bandwidth is actually available to the connection under consideration. As is well known in the art, a given link can carry more than one connection, where a share of the total (i.e. physical) bandwidth is available to each connection. Consequently, according to another preferred embodiment of the invention, the bandwidth value associated with a given link is the bandwidth currently available to the connection for said link.

In the embodiment, in which the bandwidth value associated with a link is the currently available bandwidth, one possibility of determining this value is the modification of the basic protocol underlying the packet transmission (e.g. IP in the case of packet exchange over the internet), such that each link in a connection adds this information to the packets being transmitted, be it to the data packets sent to the receiver, or to the corresponding acknowledgment packets sent by the receiver to the sender. However, in terms of the present invention, any suitable method of determining the currently available bandwidth can be used, as the invention does not depend thereon.

In the embodiment, in which the physical link bandwidth is used as the associated bandwidth, one possibility of determining these values is again the modification of the underlying network layer transmission protocol, such that the links provide this information to the sender or receiver (again e.g. IP). It is however also possible to use the method of the present invention without modifying the underlying transmission protocol. One possibility is that the relevant bandwidth information be provided not by modifying the basic transmission protocol (e.g. TCP), but by using an appropriately modified link layer protocol (e.g. SLIP, PPP or RLP) or more preferably just a modified driver for such a link layer protocol. When only modifying the driver of the link layer protocol, the present invention offers the advantage that none of the protocols involved need to be changed, so that there are absolutely no compatibility problems with established systems, and the invention can be introduced into any member of a network without having to change anything in the rest of the network.

A link layer protocol governs the communication between two partners in the communication over a specific link, where said link forms part of the connection. A typical example is accessing the internet from a personal computer over a modem link to a server. The communication between the personal computer and the server that acts a router will then be conducted in accordance with a specific protocol for such links, e.g. SLIP (serial line internet protocol) or PPP (point to point protocol). These protocols encapsulate the lower level packets, i.e. the TCP/IP packets. These protocols and encapsulation are well known in the art, and are e.g. described in the above mentioned book by W. R. Stevens, TCP/IP Illustrated. The details therefore need not be repeated here.

The driver used for running the communication in accordance with the link layer protocol could then provide the information on the physical bandwidth of the corresponding link.

The advantage of implementing the present invention by using the physical bandwidth without modifying the basic underlying transmission protocol (e.g. TCP/IP) has the advantage that the invention can be integrated into existing systems without compatibility problems, while still having the benefit of enhanced performance. Moreover, the invention can be implemented in only one partner of the communication and still be effective. This means that the present invention is generally applicable in any system using sliding window flow control, without having to modify the underlying transmission protocol of that system. This is a great advantage over the prior art, as all known solutions require modification of both communication partners or the installation of transport layer state in the network.

Returning now to the description of FIG. 8, the bandwidth values determined in step St1 represent the amount of data per unit of time that the links with which they are associated can handle.

In the next step St2, the minimum of the bandwidth values determined in step St1 is determined. If only one value was determined, then naturally this value is the minimum. It is however preferable that more than one bandwidth value be determined in step St1, so that the minimum value chosen in step St2 represents the bandwidth of the link having the lowest transmission speed among the links considered in step St1. Although it is preferable that all the links forming the connection be taken into consideration, this is by no means necessary, as will be explained further on.

Figure 3:
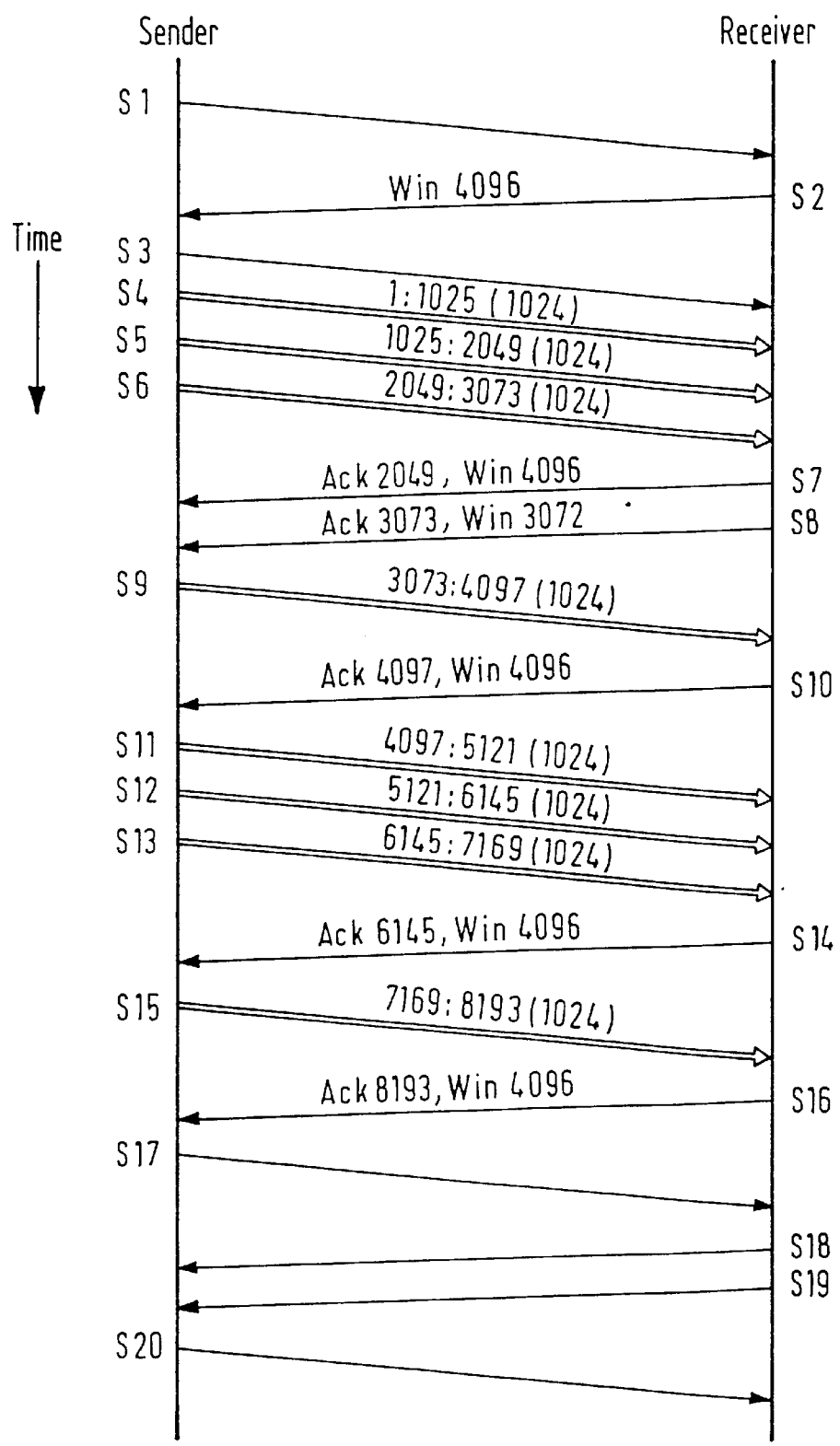
FIG. 3 shows an example of packet exchange according to TCP for transmitting the segments shown in FIG. 2.
Figure 4:
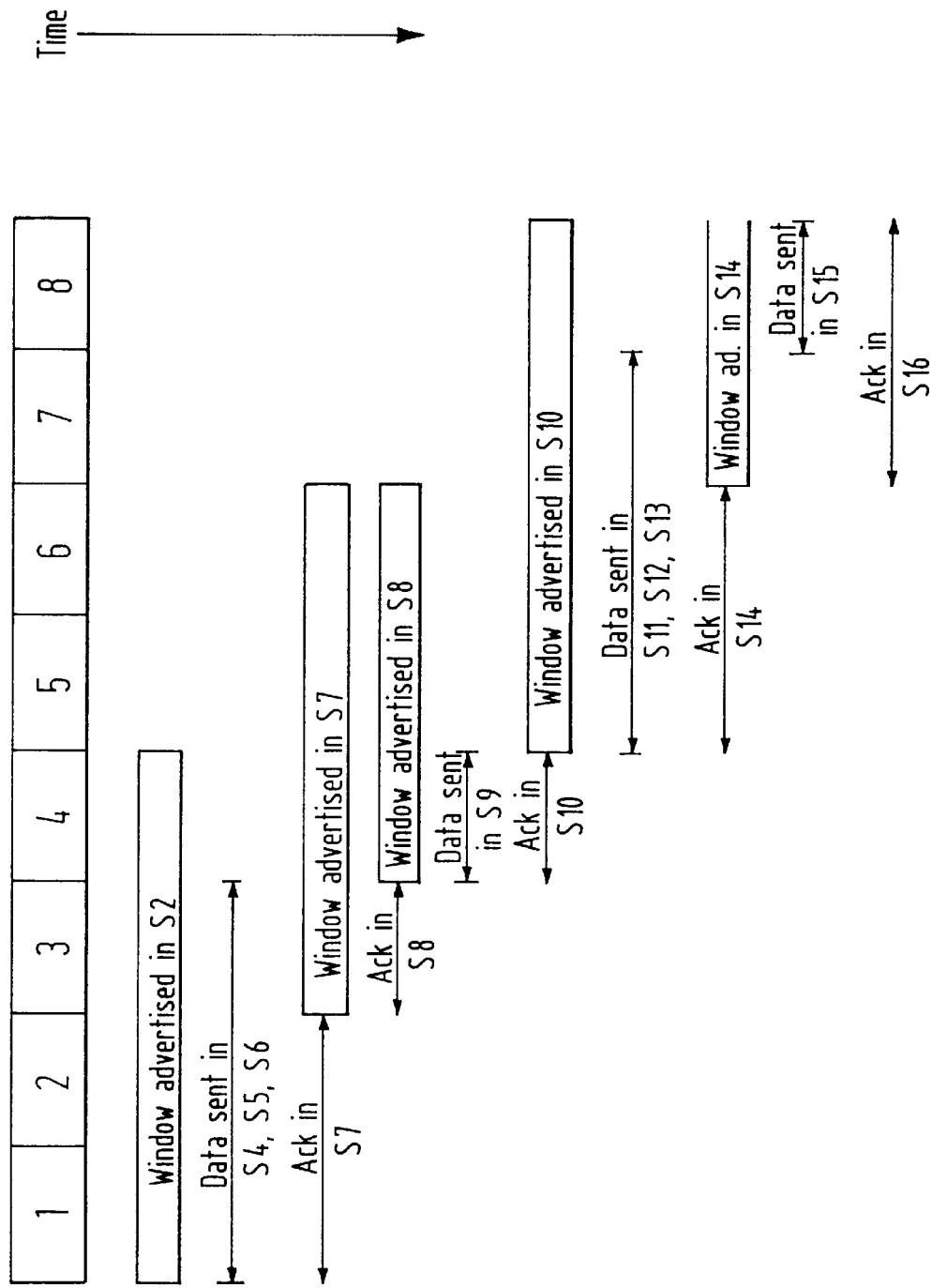
FIG. 4 explains the motion and adjustment of the control window during the flow control of the communication shown in FIG. 3.

In the next step St3 a time value that characterizes the delay along the packet exchange in the send direction (i.e. the direction from sender to receiver) is determined. This characteristic time value will generally be associated with the so called round trip time (RTT) of the connection. The RTT is defined in a given direction as the time that passes between the sending of a byte in that direction and the receipt of the direct acknowledgment of said byte. When taking the exchange of packets shown in FIG. 3 as an example, the RTT is the time that passes between the sending of segment S1 by the sender and the receipt of the acknowledgment in segment S2. In other words, the RTT is the difference between the time of receipt of the reply to a message and the sending of said message, or more specifically the time between sending a byte with a particular sequence number and receiving an acknowledgment that covers that sequence number.

It should be noted that in the present embodiment, the above mentioned characteristic time value is to be understood as any value indicative of the delay time along the packet exchange connection, i.e. the above mentioned time difference between sending out a packet and receiving the corresponding acknowledgment. Therefore, the RTT or any value derived from the RTT is suitable as said characteristic time value.

The determination of the RTT can be done in any suitable way. One specific possibility is known from chapter 21.3 of the above mentioned book by W. R. Stevens, TCP/IP Illustrated. The method disclosed therein is not limited to TCP, but can be suitably applied to any system using sliding window flow control for packet transmission. An alternative method is e.g. known from the Network Working Group Internet-Draft by V. Jacobson, R. Braden, D. Borman, February 1997.

In a simplest case, the characteristic time value can simply be directly determined as the momentary RTT by monitoring the time lapse between the sending out of a segment having a specific sequence number and the receipt of the packet containing the acknowledgment of the receipt of said segment at the other end, e.g. by an appropriate clock circuit that starts running when a segment is sent out, and outputs a value indicating the passed time when the corresponding acknowledgment packet is received. This output value is stored as the momentary RTT. Such a determination is completely suitable in a control protocol that acknowledges each individual packet or segment individually, i.e. has a one-to-one correspondence of data segments and acknowledgment messages.

However, in protocols that can also send cumulative acknowledgment messages, as in the case of TCP (see e.g. S7 in FIG. 3, which acknowledges the receipt up to 2049 bytes, i.e. the first two data segments S4 and S5), it is preferable to determine the characteristic time value of step St3 as a smoothed quantity depending on the RTT. In this case, the momentary RTT is measured as indicated above, i.e. the time delay between the sending out of a segment having a specific sequence number and the receipt of the acknowledgment that covers said sequence number (which can also cover other sequence numbers). This time value is denoted by M. Then an estimator denoted as R is updated using a low-pass filter as follows $$R \leftarrow \alpha R + (1-\alpha)M,$$

where $\alpha$ is a smoothing factor, which in TCP has a recommended value of 0.9. The momentary value of R can then be used as the characteristic time value in step St3.

Even more preferably, the characteristic time value is measured by averaging the measurement value M. This is done by calculating an error value Err and updating an average value A at each measurement of M in the following way:

$$Err = M - A,$$

$$A \leftarrow A + gErr,$$

where g is a gain value for determining the average. A typical of g is 0.125. The momentary value of A can then be used as the characteristic time value in step St3.

Figure 5:
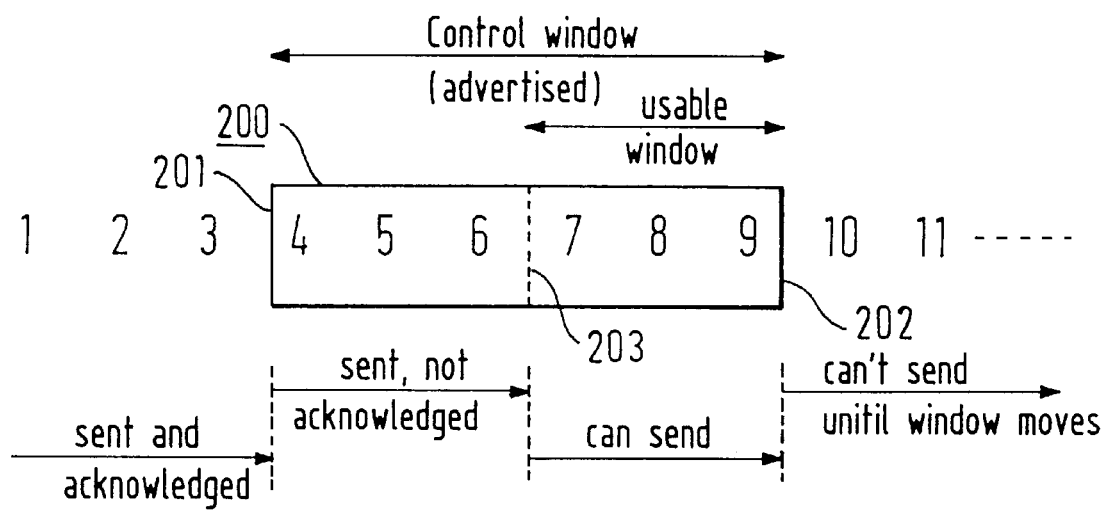
FIG. 5 is a schematic illustration showing the principle of sliding window flow control.
Figure 6:
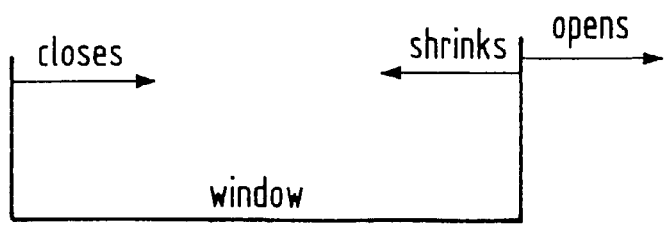
FIG. 6 is a schematic illustration of how the edges of the control window move.

Finally, in step St4, the product of the minimum bandwidth value determined in step St2 and the characteristic time value determined in step St3 is calculated, and this product is defined as the bottleneck window. According to the present invention, this bottleneck window can then be used in the sliding window flow control. The precise use is not essential to the invention, i.e. the conditions or requirements according to which the bottleneck window is used as the control window in a sliding window flow control as described in connection with FIGS. 5 and 6.

According to one embodiment, the bottleneck window is constantly used as the control window, i.e. the entire flow control is executed on the basis of the bottleneck window. According to another embodiment, the bottleneck window is used together with the known advertised window, where the control window is chosen as the minimum of the bottleneck window and the advertised window. According to yet another embodiment, the bottleneck window is used together with the known advertised window and the known congestion window, where the control window is chosen as the minimum of the advertised, congestion and bottleneck windows.

Figure 2:
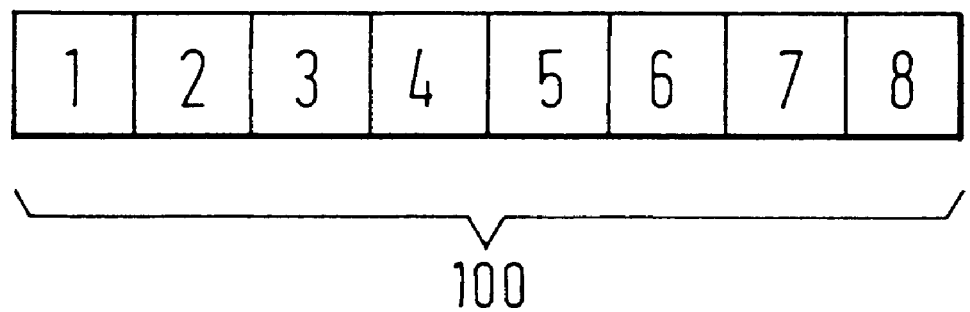
FIG. 2 shows an example of a set of data segments to be transmitted.

According to a simplest embodiment, the value of the bottleneck window is only automatically calculated once before initiating the sending of the numbered data sequence (as e.g. shown in FIG. 2). However, according to a preferred embodiment, the value of the bottleneck window is determined several times during the sending of the segments, such that the bottleneck is always updated and correctly reflects the momentary transmission state of the packet exchange connection. This measuring and updating of the bottleneck window can be done every time that further segments are to be sent, or periodically at a given time period, or constantly, i.e. the device in which the method of the present invention is implemented cycles through the process of determining the bottleneck window at the fastest possible rate, which means that the determining of a new bottleneck window is initiated every time that a cycle of determining the bottleneck window has been completed.

If the bottleneck window is dynamically adapted in the above described way, as the different parameters encountered in steps St1 to St3 tend to be variable in time, as e.g. the momentary bandwidth values available to the connection can change because of changing traffic on the network, the sender's contribution to congestion with respect to said connection at the links taken into consideration can be minimized, even if the properties of the packet exchange connection change.

It should be noted that the term "congestion" is generally used to refer to the total congestion at a link, i.e. the congestion caused by all of the traffic (all of the connections) going through said link. It is understandable that the present invention can directly only influence the part of the total congestion that is caused by the sender in the connection under consideration, i.e. the sender's contribution to the congestion. However, minimizing this contribution will naturally also minimize the total congestion.

The bottleneck window defined by the present invention is a means of minimizing congestion at a specific link and at all other links having a larger bandwidth than said specific link. This is something that the prior art is not able to achieve. In other words, as can be seen from the above description, the bottleneck window is defined in correspondence to the link with which the minimum bandwidth determined in step St3 is associated. The use of the bottleneck window minimizes the occurrence of congestion at said link. As already remarked above, it is preferable that the links taken into consideration in step St1 are all the links in the connection. In this case the bottleneck window corresponds to the link among those forming the connection that absolutely provides the lowest bandwidth. However, the invention also works when taking fewer links into consideration in step St1, because then congestion can at least safely be minimized at those links taken into consideration, which is something that the prior art cannot guarantee.

When the present invention is put to practice in a device that is a partner in a packet exchange connection with sliding window flow control, if said device is the sender, then it simply determines the bottleneck window in the send direction as described above and suitably uses it for flow control. If the partner is the receiver, then it determines the bottleneck window in its receive direction and transmits this information to the sender. For example, in a TCP connection in which only the receiver operates in accordance with the present invention, the receiver can determine the bottleneck window in its receive direction, and then advertise the minimum of bottleneck window and the window he would advertise according to standard TCP (e.g. the input buffer limit) as the advertised window to the TCP sender. In this way, the sender operates in accordance with the invention, although it has in no way been modified. In this way, the present invention has the great advantage that it can be integrated into any existing system without any compatibility problems, while still retaining the benefit of improved performance.

The present invention can be implemented in a device designed to be a sender or designed to be a receiver, but will typically be implemented in a device that can act both as a sender and a receiver, depending if data is to be sent from said device, or to be received by said device.

If the present invention is implemented according to the embodiment shown in FIG. 8 in a device acting as a sender, control can be performed such that the device appropriately determines one or more bandwidth values for the links (step St1 in FIG. 8) and then determines the minimum (step St2). Any of the possibilities mentioned above in connection with steps St1 and St2 can be used. The determination of the delay indicative value (step St3) can also be directly performed as described above, e.g. by measuring the time that passes between the sending of a byte and the receipt of the acknowledgment covering said byte. The product of the minimum bandwidth value and the delay indicative value can then be calculated in said sender and appropriately used in the flow control as the bottleneck window.

If on the other hand the present invention is implemented according to the embodiment shown in FIG. 8 in a device acting as a receiver, control can again be performed such that the device appropriately determines one or more bandwidth values for the links (step St1 in FIG. 8) and then determines the minimum (step St2). Any of the possibilities mentioned above in connection with steps St1 and St2 can again be used. The determination of the delay indicative value in the direction from the sender to the receiver can be performed in any suitable way. One possibility is the sending out by the receiver of a dedicated connection delay time measurement message to the sender and measuring the time until a corresponding acknowledgment is returned. This necessitates that both the receiver and the sender in the connection operate according to a protocol that supports such delay time measurement messages. In a preferred embodiment, such a protocol is not necessary, because the receiver can independently determine the delay indicative value. It is only assumed that a system of acknowledging the receipt of data is given between the sender and receiver. Then the receiver will determine the RTT of the connection by measuring the difference between the sending the acknowledgment ACK (n) and receiving a segment covering byte number n+1, where ACK(n) refers to the acknowledgment for all bytes including and up to byte number n in the sequence being sent by the sender. The thus determined value can be directly used for calculating the bottleneck window, or a smoothing and/or averaging can be performed, similarly to the above explanation in connection with the values R and A. The bottleneck window can then be provided to the sender in any appropriate way, e.g. in the form of the advertised window, as already explained above.

According to another embodiment of the invention, which will be described in the following, the invention is applied to TCP communication, and the following definitions will be used. It should be noted that TCP in the just mentioned sense refers to the transmission control protocol used on the internet, in the sense that all past, present and future variations and implementations of this protocol, e.g. in accordance with any predominant standard, are included.

A communication device in which the TCP protocol is implemented and which forms one end of TCP connection is referred to as a "TCP peer". Each TCP peer can run as a TCP sender or TCP receiver or as both at the same time. A TCP peer that is modified according to this invention is called a "modified TCP peer", otherwise it is called a "standard TCP peer". The terms "modified TCP sender", "modified TCP receiver", "standard TCP sender" and "standard TCP receiver" are used accordingly. Without the qualifier "modified" or "standard", the relevant terms refer to both cases. For the purpose of explanation, the standard TCP peer is assumed to be implemented according to the above cited book by W. R. Stevens, TCP/IP Illustrated, Volume 1, but this embodiment is applicable to any variation of TCP, as long as the assumptions and preconditions set out in connection with this embodiment are met.

According to this embodiment, a modified TCP peer is a standard compliant modification of a standard TCP peer, i.e. a modified TCP peer behaves conform to the current TCP protocol standards, which guarantees backwards compatibility with existing TCP implementations.

The term "Maximum Link Bandwidth" (MLB) will refer to the bandwidth of the physical connection corresponding to that link, which is available to the sender on said link.

The minimum of all MLBs that are taken into consideration by a modified TCP peer for a particular direction of a TCP connection (send or receive) is called "MinMLB" of the relevant direction. It is to be noted that the MinMLB can be different for the send or receive directions of a TCP peer as the path of links for the send direction is not necessarily the same as the path of links for the receive direction. Furthermore, it should be noted that the MinMLB as defined above is not the minimum of all MLBs of all links that constitute a TCP connection in one direction. In most cases a modified TCP peer will not take all MLBs into consideration, e.g. because it is not necessary or they are not known to him. The MinMLB can change over time, e.g. as the value of a known MLB changes, or a new MLB is taken into consideration, which was not taken into consideration before, and this new MLB is lower than the previous MinMLB.

The term "bottleneck window" for a given direction (send or receive) is used for the product of the current MinMLB in that direction and the current RTT in that direction. As with the MinMLB, the bottleneck window can be different for the send and receive directions of a TCP peer.

In accordance with the present embodiment, a modified TCP sender is restricted to not send faster than the current MinMLB of his send direction and that a modified TCP receiver will control the corresponding TCP sender to not let him send faster than the modified TCP receiver's current MinMLB of his receive direction. The latter is equivalent to saying that the corresponding TCP sender is not allowed to send faster than the current MinMLB of his send direction.

Not sending faster than the MinMLB means that the TCP sender will not be allowed to have more unacknowledged packets outstanding than given by the bottleneck window of his send direction. A modified TCP sender will continuously trace the current MinMLB and the current RTT of his send direction. A modified TCP receiver will continuously trace the current MinMLB and the current RTT of his receive direction, i.e. trace the bottleneck window of the corresponding TCP sender's send direction.

According to the present embodiment, the flow control in the modified TCP sender is supplemented by the bottleneck window of his send direction, i.e. the bottleneck window is used together with the advertised window and the congestion window in determining the control window used. The control window is chosen as the minimum of the three windows, which means that the modified TCP sender may not have more unacknowledged packets outstanding than the minimum of the advertised window, the congestion window and the bottleneck window of his send direction. Furthermore according to the present embodiment, the modified TCP receiver determines the bottleneck window of his receive direction, and then advertises the minimum of bottleneck window and the window he would advertise according to standard TCP (e.g. the input buffer limit) as the advertised window to the TCP sender.

If the embodiment is implemented in a device acting as a sender, then the determination of the RTT in the sending direction, which is used in the determination of the bottleneck window, can be done by measuring the momentary RTT by monitoring the time lapse between the sending out of a byte having a specific sequence number and the receipt of the acknowledgment from the receiver relating to the receipt of said byte. This value is referred to as M. Then an error value Err is calculated and an average value A is updated at each measurement of M in the following way:

$Err=M-A,$ $A \leftarrow A+gErr,$ where g is a gain value for determining the average. A typical of g is 0.125. The momentary value of A is then used as the RTT value employed for calculating the bottleneck window.

If the embodiment is implemented in a device acting as a receiver, then the determination of the RTT in the sending direction (i.e. the direction from the sender to the receiver), which is used in the determination of the bottleneck window, can be done by measuring the momentary RTT in a modified way.

The current RTT value, which will again be referred to as M, is determined by monitoring the time lapse between the sending out by the receiver of an acknowledgment ACK(n), which acknowledges the receipt of all bytes including and up to byte number n, and the receipt by the receiver of the TCP segment covering byte number n+1. The employed value of RTT is again determined as A in the following way:

$Err=M-A,$ $A \leftarrow A+gErr.$

As the situation in the reverse direction is not identical to the situation in the sending direction, a problem occurs when the segment covering byte number n is delayed at the TCP sender, e.g. because the application has not released it yet. In this case the measured momentary RTT M should not be used to update the value A, i.e. such values of M should be skipped. The decision of skipping is done on the basis of the inter-packet arrival time of TCP packets received by the receiver. In other words, according to the present embodiment, the modified receiver measures the packet inter-arrival time along with the momentary RTT, and compares the arrival time with a threshold, and if the arrival time exceeds said threshold, then the measured momentary value RTT is not used to update A in the above mentioned formula.

According to the present embodiment, the device running according to the present invention, be it as a sender or as a receiver, determines the MinMLB as the bandwidth of its access link that is momentarily available to the device. Only one MLB is determined, which is automatically equal to the MinMLB. As the access link is used in both directions, i.e. sending and receiving, no distinction between sending and receiving direction needs to be made in this case. The access link is the link that connects the device to the next router along the connection. In accordance with this embodiment, the available bandwidth is supplied by the link layer driver. The link layer driver keeps a running throughput metric that takes the recent past into account, i.e. it measures the throughput of data (in bytes) over intervals of time and divides the measured throughputs by the length of said intervals, to thereby continuously measure the bandwidth as said quotient of the throughput and interval length. This is done continuously, i.e. after one measurement over an interval has ended, the next is begun. Another possibility is to take a running average over a span of a given amount of time (e.g. a few seconds) that has passed. This function can be implemented into the link layer driver of the device, by appropriately implementing used link layer protocol, e.g. SLIP, PPP or RLP. Amending the implementation means that the standard protocol is fully retained, such that communication with any standard implementation is retained, i.e. compatibility, but that the above mentioned special function of bandwidth determination is added into the implementation at the device operating in accordance with the present embodiment of the invention.

Conventional techniques for improving TCP performance require that the implementations on both end points (i.e. sender and receiver) of TCP's bi-directional communication path be modified. Consequently, for such a technique to be successful, all existing TCP implementations of those hosts with which communication is sought would have to be upgraded. Given today's wide spread of internet servers, this would be impractical. Other approaches to improving TCP performance require maintenance of per TCP flow state in the network, resulting in the drawback of per flow resource demands in the network.

The above embodiment has the advantage that TCP performance is increased both in the send and receive direction by modifying only one side of an end-to-end TCP connection.

What is claimed is:

1. A method of controlling the flow of a data amount from a sender to a receiver in a packet exchange connection, said packet exchange connection including a plurality of links connected by routers, comprising:
   controlling said sender to determine from said data amount a data sequence to be sent;
   automatically determining one or more bandwidth values respectively associated with one or more of said links by monitoring bandwidth values of one or more of said links at one or both of each said sender and said receiver;
   employing said one or more bandwidth values in the process of controlling the flow of said data sequence from said sender to said receiver; and
   acknowledging the receipt of data in the receiver by returning to the sender messages that indicate up to which point in said data sequence data has been received,
   controlling the sending of said data sequence so that only data inside a data window defining a data amount expressed in units of data is sent at a point in time, said data window being defined by a first limit determined based on an amount of data already sent and acknowledged which falls outside of said window, and by a second limit determined by adding a data window size value to said first limit, and
   employing said one or more bandwidth values in the process of determining said data window size value.

2. The method of claim 1, wherein said one or more bandwidth values are determined more than once during the sending of said data sequence.

3. The method of claim 1, wherein said one or more bandwidth values are determined at regular intervals of time during the sending of said data sequence.

4. The method of claim 1, wherein said one or more bandwidth values are determined continuously during the sending of said data sequence.

5. The method of claim 1, wherein said one or more bandwidth values are determined before every sending of a new packet.

6. The method of claim 1, further comprising:
   determining said one or more bandwidth values associated with said plurality of links in the direction in which said data sequence is to be sent,
   determining a minimum of said one or more bandwidth values,
   determining a time value that characterizes an amount of time that passes between the sending of a given byte by said sender and the receipt of an acknowledgment that said given byte has been received by the receiver, said time value for said connection being determined in the direction in which said sequence is to be sent, and
   determining a product of said minimum of said one or more bandwidth values and said time value as a link dependent data amount value, which is employed in the process of determining said data window size value.

7. The method of claim 6, wherein said link dependent data amount value is used as said data window size value.

8. The method of claim 6, wherein said data window size value is determined by selecting a smallest value from a group of data amount values, said link dependent data amount value being among said group.

9. The method of claim 8, wherein said packet exchange connection is established in accordance with TCP, and said data window size value is selected from the group including the advertised window, the congestion window, and said link dependent data amount value.

10. The method of claim 6, wherein said packet exchange connection is established in accordance with TCP and said time value is determined as a function of the round trip time for said connection in the direction that the data sequence is to be sent.

11. The method of claim 1, wherein the bandwidth value associated with a link is the physical bandwidth of said link.

12. The method of claim 1, wherein the bandwidth value associated with a link is the bandwidth currently available to said connection in said link in the direction from the sender to the receiver.

13. The method of claim 1, wherein said bandwidth values comprise at least one of the bandwidth values associated with the access link of said sender and the access link of said receiver, said access link of said sender being the link connecting said sender with the next router along said packet exchange connection in the direction said data sequence is to be sent, and said access link of said receiver being the link connecting said receiver with the next router along said packet exchange connection against the direction said data sequence is to be sent.

14. The method of claim 13, wherein said bandwidth value associated with an access link is provided by a link layer driver for said access link in one or both of said sender and said receiver.

15. A device for controlling the flow of a data amount from a sender to a receiver in a packet exchange connection, said packet exchange connection consisting of a plurality of links connected by routers, comprising:

data sequence determining circuitry configured to determine from said data amount a data sequence to be sent;

bandwidth determining circuitry configured to determine one or more bandwidth values respectively associated with one or more of said links by monitoring bandwidth values of one or more of said links at one or both of said sender and said receiver; and a controller for employing said one or more bandwidth values in the process of controlling the flow of said sequence from said sender to said receiver, wherein received data is acknowledged by messages that indicate up to which point in said data sequence data has been received, wherein the controller is configured to control the sending of said data sequence so that only data inside a data window defining a data amount expressed in units of data is sent at a point in time, said data window being defined by a first limit based on an amount of data already sent and acknowledged which falls outside of said window and by a second limit determined by adding a data window size value to said first limit, and wherein the controller is configured to employ said one or more bandwidth values in the process of determining said data window size value.

16. A communications device for sending and receiving data over a packet exchange connection, said packet exchange connection consisting of a plurality of links connected by routers, comprising:

a controller for controlling said communications device, wherein when said communications device acts as a sender, the controller is configured to send an amount of data over said connection as a data sequence, to determine one or more bandwidth values respectively associated with one or more of said links in the direction in which said data sequence is to be sent, and to control the flow of said data sequence sent from said sender using said one or more bandwidth values and wherein when said communications device acts as a receiver, the controller is configured to receive data over said connection from a communications partner at the other end of said connection, to determine one or more bandwidth values, in the direction from said partner to said device respectively associated with one or more of said links and to send a message to said partner such that said one or more bandwidth values is used in controlling the flow of said data sent by said partner, wherein a protocol for sending data over said connection is such that a receiver acknowledges receipt of a sequence of data bytes by returning to a sender of said sequence a message that indicates up to which byte has been received, and the sending of a sequence of data bytes is performed such that only data inside a data window defining a data amount expressed in units of data is sent at a point in time, said data window being defined by a first limit determined based on an amount of data already sent and acknowledged which falls outside of said window and by a second limit determined by adding a data window size value to said first limit, wherein said controller, when said communications device acts as a sender, is configured to use said one or more bandwidth values in determining said data window size value, and wherein said controller, when said communications device acts as a receiver, is configured to determine a data amount value based on said one or more bandwidth values, said amount value to be sent to said partner for use in determining said data window size value in said partner.

17. The device of claim 16, wherein said controller is configured such that said one or more bandwidth values are determined more than once during the sending of said data sequence when said communications device acts a sender, and said one or more bandwidth values are determined more than once during the receiving of said data sequence when said communications device acts a receiver.

18. The device of claim 16, wherein said controller is configured such that said one or more bandwidth values are determined at regular intervals of time during the sending of said data sequence when said communications device acts a sender, and said one or more bandwidth values are determined at regular intervals of time during the receiving of said data sequence when said communications device acts a receiver.

19. The device of claim 16, wherein said controller such that said one or more bandwidth values are determined continuously during the sending of said data sequence when said communications device acts a sender, and said one or more bandwidth values are determined continuously during the receiving of said data sequence when said communications device acts a receiver.

20. The device of claim 16, wherein said controller is configured, when said communications device acts as a sender, to determine said one or more bandwidth values associated with said plurality of links in the direction in which said sequence of data is to be sent, determine the minimum of said one or more bandwidth values, determine a time value that characterizes the amount of time that passes between the sending of a given byte by said sender and the receipt of an acknowledgment that said given byte has been received at the other end of the connection, and determine a product of said minimum of said one or more bandwidth values and said time value as a link dependent data amount value, which is employed determining said data window size value.

21. The device of claim 20, wherein said packet exchange connection is established in accordance with TCP and said time value is determined as a function of the round trip time for said connection in the direction that the data sequence is to be sent.

22. The device of claim 16, wherein said controller, when said communications device acts as a receiver, is configured to determine said one or more bandwidth values associated with said plurality of links in the direction in which data is to be sent, determine the minimum of said one or more bandwidth values, determine a time value that characterizes the amount of time that passes between the sending of a given acknowledgment message covering a certain byte by said receiver and the receipt of the next byte in said data sequence being sent from the partner in said connection at the other end of said connection, and the product of said minimum of said one or more bandwidth values and said time value as a link dependent data amount value, which is sent to said partner to be employed in determining said data window size value by said partner.

23. The device of claim 20, wherein said link dependent data amount value is used as said data window size value.

24. The device of claim 20, wherein said data window size value is determined by selecting the smallest value from a group of data amount values, said link dependent data amount value being among said group.

25. The device of claim 24, wherein said packet exchange connection is established in accordance with TCP, and said controller, when said communications device acts a sender, is configured to select said data window size value from the group including the advertised window, the congestion window, and said link dependent data amount value.

26. The device of claim 24, wherein said packet exchange connection is established in accordance with TCP, and said controller, when said communications device acts a receiver, is configured to send said link dependent data amount value to said partner as the advertised window.

27. The device of claim 16, wherein the bandwidth value associated with a link is the physical bandwidth of said link.

28. The device of claim 16, wherein the bandwidth value associated with a link is the bandwidth currently available to said connection in said link in the direction in which said data is to be sent.

29. The device of claim 16, wherein said bandwidth values comprise the bandwidth value associated with the access link of said device, said access link being the link connecting said communications device with the next router along said packet exchange connection.

30. The device of claim 29, further having a link layer driver, and where said bandwidth value associated with said access link is provided by said link layer driver.

* * * * *